US012785872B2

(12) United States Patent
Xue et al.

(10) Patent No.: US 12,785,872 B2
(45) Date of Patent: Nov. 3, 2026

(54) METHODS, DEVICES, AND SYSTEMS FOR MAPPING MULTIPLE TRANSPORT BLOCKS IN FREQUENCY DOMAIN

(71) Applicant: ZTE Corporation, Shenzhen (CN)

(72) Inventors: Yan Xue, Shenzhen (CN); Feng Xie, Shenzhen (CN); Hanchao Liu, Shenzhen (CN); Fei Wang, Shenzhen (CN); Jun Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 18/594,988

(22) Filed: Mar. 4, 2024

(65) Prior Publication Data

US 2024/0214136 A1 Jun. 27, 2024

Related U.S. Application Data

(63) Continuation of application No. PCT/CN2021/123034, filed on Oct. 11, 2021.

(51) Int. Cl.
*H04L 5/00* (2006.01)
*H04L 1/1812* (2023.01)

(52) U.S. Cl.
CPC .......... *H04L 5/0016* (2013.01); *H04L 1/1812* (2013.01); *H04L 5/0055* (2013.01)

(58) Field of Classification Search
CPC .... H04L 1/1812; H04L 5/0016; H04L 5/0055
(Continued)

(56) References Cited

U.S. PATENT DOCUMENTS

2011/0299500 A1* 12/2011 Papasakellariou ... H04B 7/0413 370/329
2014/0169276 A1* 6/2014 Choi .......................... H04L 1/06 370/328

(Continued)

FOREIGN PATENT DOCUMENTS

CN 109309958 A 2/2019
EP 2645788 A1 * 10/2013 ........... H04L 1/1607

(Continued)

OTHER PUBLICATIONS

International Search Report and Written Opinion, dated Jul. 8, 2022, pp. 1-7, issued in International Application No. PCT/CN2021/123034, National Intellectual Property Administration, Beijing, China.

(Continued)

*Primary Examiner* — Anthony Mejia
(74) *Attorney, Agent, or Firm* — Crowell & Moring LLP

(57) ABSTRACT

The present disclosure describes methods, system, and devices for mapping multiple transport blocks (TBs) in a frequency domain. The method includes transmitting a set of transport blocks (TBs) between a first wireless device and a second wireless device by: mapping the set of TBs in a resource space comprising a time unit in a time domain and a frequency unit in a frequency domain, wherein: each TB mapped to a same codeword in the set of TBs is separated in frequency domain; the set of TBs comprises n TBs mapped to the same codeword, and n is an integer larger than 1; and each TB in the set of TBs is capable of being packaged separately at a transmitting end, and capable of being delivered separately to an upper layer at a receiving end.

17 Claims, 10 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2018/0199314 | A1 | 7/2018 | Takeda et al. | |
| 2018/0279281 | A1* | 9/2018 | Li | H04W 72/0453 |
| 2021/0321414 | A1* | 10/2021 | Yeo | H04L 1/1896 |
| 2021/0360638 | A1* | 11/2021 | Lin | H04W 72/21 |
| 2022/0304013 | A1* | 9/2022 | He | H04L 1/1822 |
| 2024/0204937 | A1* | 6/2024 | Xue | H04L 5/0005 |
| 2024/0205895 | A1* | 6/2024 | Xue | H04W 72/0446 |
| 2024/0205909 | A1* | 6/2024 | Xue | H04L 1/0041 |
| 2024/0214136 | A1* | 6/2024 | Xue | H04L 5/0005 |
| 2025/0023698 | A1* | 1/2025 | Li | H04L 1/1854 |

FOREIGN PATENT DOCUMENTS

| | | | |
|---|---|---|---|
| WO | WO 2020/043137 | A1 | 3/2020 |
| WO | WO 2020/147764 | A1 | 7/2020 |

OTHER PUBLICATIONS

LG Electronics, Discussion on cooperative transmission, pp. 1-4, Sep. 18-21, 2017, 3GPP TSG RAN WG1 Meeting NR#3, Nagoya, Japan.
CATT, PDSCH and PUSCH resource allocation, pp. 1-9, Oct. 9-13, 2017, 3GPP TSG RAN WG1 Meeting 90bis, Prague, CZ.
Extended European Search Report issued in European application No. 219601382, dated Sep. 13, 2024, 9 pages.

* cited by examiner

METHODS, DEVICES, AND SYSTEMS FOR MAPPING MULTIPLE TRANSPORT BLOCKS IN FREQUENCY DOMAIN

This application is a continuation application of PCT International Application No. PCT/CN2021/123034, filed with the China National Intellectual Property Administration, PRC on Oct. 11, 2021, wherein the content of each of the above-referenced application is incorporated herein by reference in its entirety.

TECHNICAL FIELD

The present disclosure is directed generally to wireless communications. Particularly, the present disclosure relates to methods, devices, and systems for mapping multiple transport blocks (TBs) in a frequency domain.

BACKGROUND

Wireless communication technologies are moving the world toward an increasingly connected and networked society. High-speed and low-latency wireless communications rely on efficient network resource management and allocation among one or more user equipment and one or more wireless access network nodes (including but not limited to base stations). A new generation network is expected to provide high speed, low latency and ultra-reliable communication capabilities and fulfill the requirements from different industries and users.

With the rapid evolution of cellular mobile communication systems, more and more applications emerge in various businesses and/or service industries. Some services, such as holographic communication, industrial internet traffic and immersive cloud extended reality (XR), need to meet ultra-high throughput, ultra-high reliability and ultra-low latency at the same time. This type of services not only has extremely high requirements for throughput, but also high requirements for low latency. There are problems or issues associated with the present wireless communication technology, and it is difficult to meet the high reliable transmission of data at a large volume under low-latency requirements.

The present disclosure describes various embodiments for mapping multiple transport blocks (TBs) in a frequency domain, addressing at least one of the problems/issues discussed above. The various embodiments in the present disclosure may enhance performance of enhanced mobile broadband (eMBB) and/or ultra reliable low latency communication (URLLC) and/or provide new scenarios requiring large bandwidth and low latency, improving a technology field in the wireless communication.

SUMMARY

This document relates to methods, systems, and devices for wireless communication, and more specifically, for mapping multiple transport blocks (TBs) in a frequency domain.

In one embodiment, the present disclosure describes a method for wireless communication. The method includes transmitting a set of transport blocks (TBs) between a first wireless device and a second wireless device by: mapping the set of TBs in a resource space comprising a time unit in a time domain and a frequency unit in a frequency domain, wherein: each TB mapped to a same codeword in the set of TBs is separated in frequency domain; the set of TBs comprises n TBs mapped to the same codeword, and n is an integer larger than 1; and each TB in the set of TBs is capable of being packaged separately at a transmitting end, and capable of being delivered separately to an upper layer at a receiving end.

In another embodiment, the present disclosure describes a method for wireless communication. The method includes receiving from a first wireless device, by a second wireless device, a higher layer message carrying a radio configuration information of a set of TBs, wherein: the set of TBs comprises n TBs mapped to a same codeword, and n is an integer larger than 1, the set of TBs is mapped in a resource space comprising a time unit in a time domain and a frequency unit in a frequency domain, each TB in the n TBs is separated in frequency domain, and each TB in the n TBs is capable of being packaged separately at a transmitting end, and capable of being delivered separately to an upper layer at a receiving end; and in response to receiving the higher layer message, operating, by the second wireless device according to the radio configuration information of the set of TBs.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

Figure 1:
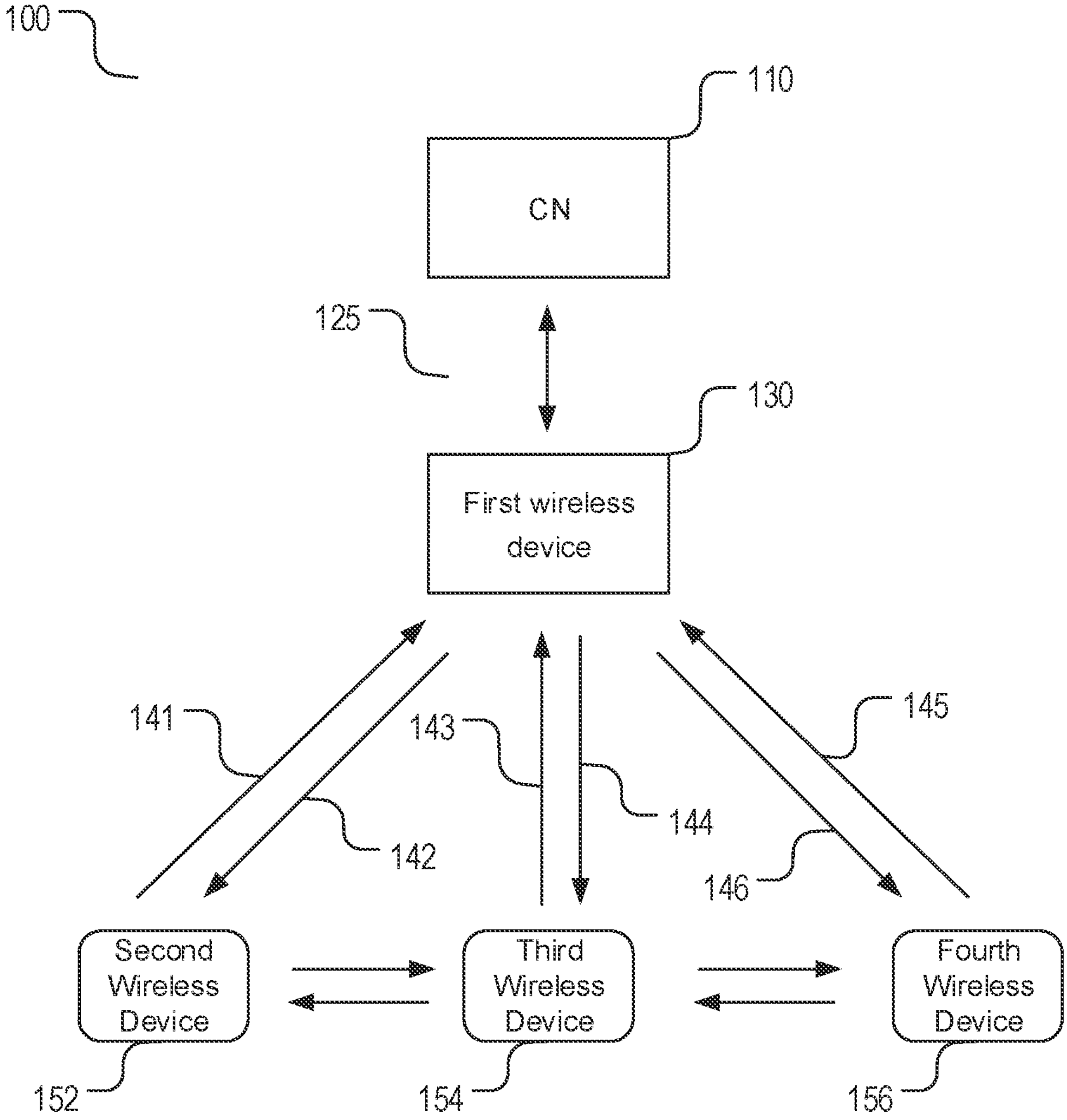
FIG. 1 shows an example of a wireless communication system include a core network, a first wireless device, a second wireless device, a third wireless device, and a fourth wireless device.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for mapping multiple transport blocks (TBs) in a frequency domain.

New generation (NG) mobile communication system are moving the world toward an increasingly connected and networked society. High-speed and low-latency wireless communications rely on efficient network resource management and allocation among one or more user equipment and one or more wireless access network nodes (including but not limited to wireless base stations). A new generation network is expected to provide high speed, low latency and ultra-reliable communication capabilities and fulfill the requirements from different industries and users.

With the rapid evolution of cellular mobile communication systems, more and more applications emerge in various businesses and/or service industries. Some services, such as holographic communication, industrial internet traffic and immersive cloud extended reality (XR), need to meet ultra-high throughput, ultra-high reliability and ultra-low latency at the same time. This type of services integrates the characteristics of the two scenarios of high performance and high efficiency wireless networks: extremely high requirements for throughput, but also high requirements for low latency. For example but not limited, the large bandwidth, high throughput, and low latency scenarios may need the high reliable transmission of data at a large volume under low-latency requirements.

In a 4G and/or a 5G system, on a baseband carrier (e.g., also called a single cell), each transport block (TB) may be scheduled for transmission on a baseband carrier with a transmission time interval (TTI) as a basic time-domain scheduling unit. Each hybrid automatic repeat request (HARQ) process may be in a TTI. A TB is called a codeword after channel coding process. In the spatial multiplexing transmission, there are up to two codewords, which are called the first codeword and the second codeword according to the layer mapping configuration. A codeword may be mapped to all or part of the layers. Multiple different data streams can be transmitted on different layers simultaneously. After using the spatial multiplexing technology, a UE may be allowed to transmit one TB on a carrier and a HARQ process in response to a single codeword transmission; and/or a UE may be allowed to simultaneously transmit two TBs on a carrier and a HARQ process in response to a two codeword transmission. In other words, for the same user, no more than two TBs may be scheduled in a time-domain transmission unit. In order to increase the throughput, one way is to increase the number of bits contained in a TB, that is, to expand the TB Size (TBS). However, considering factors such as coding and interleaving gain, the TB size is limited. For example, in long term evolution (LTE), a TBS may be required to be no greater than 6144 bits. In response to a TB being larger than 6144 bits, this TB may be divided into multiple code blocks (Code Block, CB) for encoding and transmission.

In various embodiments, each TB may include a cyclical redundancy check (CRC), and each CB in each TB may also include a CRC. When the CRC check of a certain CB fails, only this CB may need to be retransmitted, and the entire TB may not need to be retransmitted.

In some implementations in a 5G new radio (NR), in order to reduce the feedback overhead of CB transmission, a code block group (CBG) method may be used for feedback, that is, multiple CBs may be used as a group to use 1 bit for acknowledgement/negative acknowledgement (ACK/NACK) feedback. One of the issues associated with this approach may be that, when a CB is unsuccessful in transmission, the entire CBG where the wrong CB is located must be retransmitted. Only when the CRC check of all CBs and the CRC check of the entire TB pass, the TB transmission may be considered successful. After using code block segmentation, as the number of CBs and CBGs increases, the supported TBS may increase as well. Because each CB needs a CRC check, the larger the TB, the higher the possibility of CB transmission failure. CB transmission failure may result in CB retransmission. As long as there is a CB transmission failure in the TB, it may be retransmitted and waited. After all the CB transmissions are successful and the CRC of the CB level and the TB level are both verified, the TB may be submitted to the upper layer. One of the issues/problems with this approach is that the more CB and CBG, the longer the waiting time may be. For services with high latency requirements, such as live video services, data packets must be transmitted correctly within a certain period of time. When it times out, even the transmission is correct, it will be considered unsatisfactory and discarded. Moreover, a TB is transmitted on the allocated overall frequency domain resources of a TTI. If the currently allocated frequency domain resources are experiencing large channel fading, the probability of transmission failure may be relatively high, which is intolerable for some TB data with high reliability requirements. Thus, the existing technology may be difficult to meet the requirements of high throughput, high reliability and low latency at the same time, for example, the packet of high reliability is expected to be successfully received as soon as possible. If the packet of high reliability is in the worse channel condition, it is difficult to meet reliability requirements. In other words, it may be difficult to use frequency selective gain, and/or it may be difficult to realize frequency domain differentiated transmission to improve high reliability. One of the issues/problems associated with some of the above approaches may be that, for large bandwidth scenarios, even when frequency domain resources are sufficiently available, large throughput, high reliability and low delay transmission may be difficult to achieve simultaneously.

In some of the present implementations, for TB with high reliability demand in large bandwidth transmission, it may be difficult to use frequency selective gain, and/or it may be difficult to realize frequency domain differentiated transmission to improve high reliability.

There are problems or issues associated with the present wireless communication technology, and it is difficult to meet the reliable transmission of data at a large volume under low-latency requirements. One of the problems/issues is that it may be difficult to achieve differential transmission in a frequency domain for multiple TBs, when transmitted data may have differential priority requirement, for example, it may be difficult to use frequency selective gain, and/or it may be difficult to realize frequency domain differentiated transmission to meet different reliability requirement.

The present disclosure describes various embodiments for mapping multiple transport blocks (TBs) in a frequency domain, addressing at least one of the problems/issues discussed above. The present disclosure may enhance performance of enhanced mobile broadband (eMBB) and/or ultra reliable low latency communication (URLLC), improving a technology field in the wireless communication.

FIG. 1 shows a wireless communication system 100 including a portion or all of the following: a core network (CN) 110, a first wireless device 130, a second wireless device 152, a third wireless device 154, and a fourth wireless device 156. There may be wireless communication between any two of the first wireless device, the second wireless device, the third wireless device, and the third wireless device.

The first wireless device may include one of the following: a base station; a MAC layer in a wireless device; a scheduling unit; a user equipment (UE); an on-board unit (OBU); a road-side unit (RSU); or an integrated access and backhaul (IAB) node.

The second wireless device, the third wireless device, or the third wireless device may include one of the following: a user equipment (UE); or an integrated access and backhaul (IAB) node.

In various embodiments, the first wireless device 130 may include a wireless node. The second wireless device, the third wireless device, and/or the third wireless device may include one or more user equipment (UE) (152, 154, and 156). The wireless node 130 may include a wireless network base station, a radio access network (RAN) node, or a NG radio access network (NG-RAN) base station or node, which may include a nodeB (NB, e.g., a gNB) in a mobile telecommunications context. In one implementation, the core network 110 may include a 5G core network (5GC or 5GCN), and the interface 125 may include a NG interface. The wireless node 130 (e.g, RAN) may include an architecture of separating a central unit (CU) and one or more distributed units (DUs). In another implementation, the core network 110 may include a 6G core network or any future generation network.

The communication between the RAN and the one or more UE may include at least one radio bearer or channel (radio bearer/channel). Referring to FIG. 1, a first UE 152 may wirelessly receive from the RAN 130 via a downlink radio bearer/channel 142 and wirelessly send communication to the RAN 130 via a uplink radio bearer/channel 141. Likewise, a second UE 154 may wirelessly receive communicate from the RAN 130 via a downlink radio bearer/channel 144 and wirelessly send communication to the RAN 130 via a uplink radio bearer/channel 143; and a third UE 156 may wirelessly receive communicate from the RAN 130 via a downlink radio bearer/channel 146 and wirelessly send communication to the RAN 130 via a uplink radio bearer/channel 145.

Figure 2:
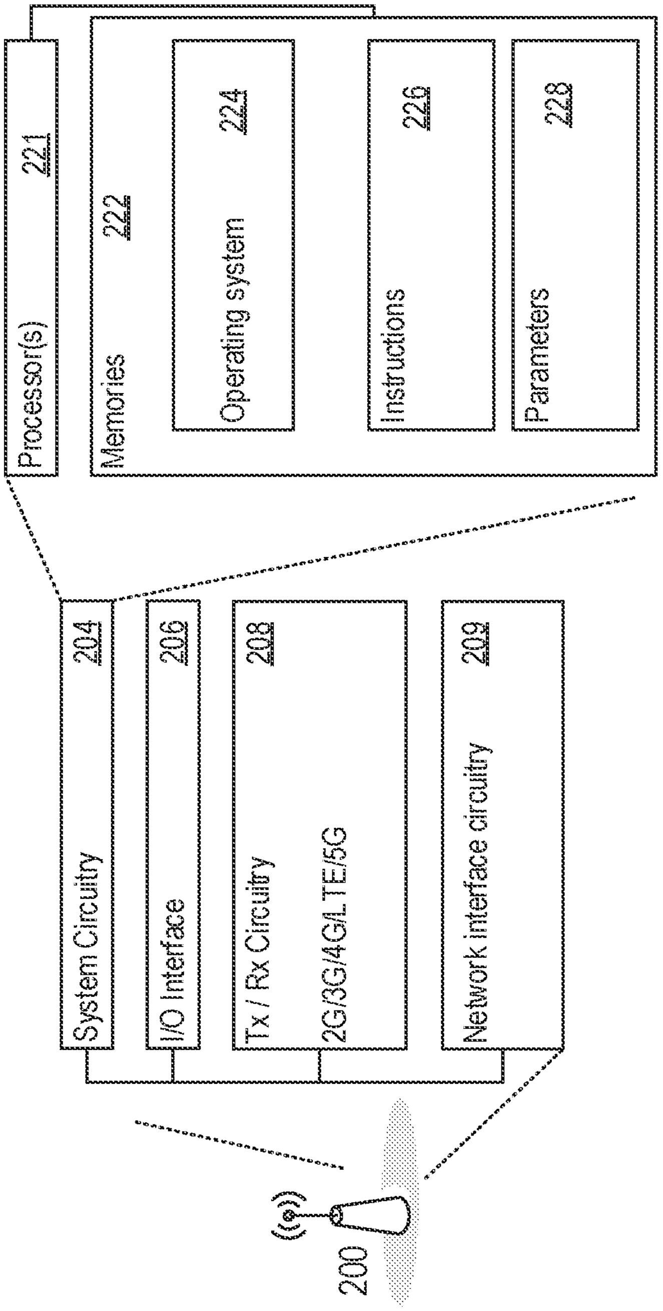
FIG. 2 shows an example of a wireless network node.

FIG. 2 shows an example of electronic device 200 to implement a network base station (e.g., a radio access network node), a core network (CN), and/or an IAB node. Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
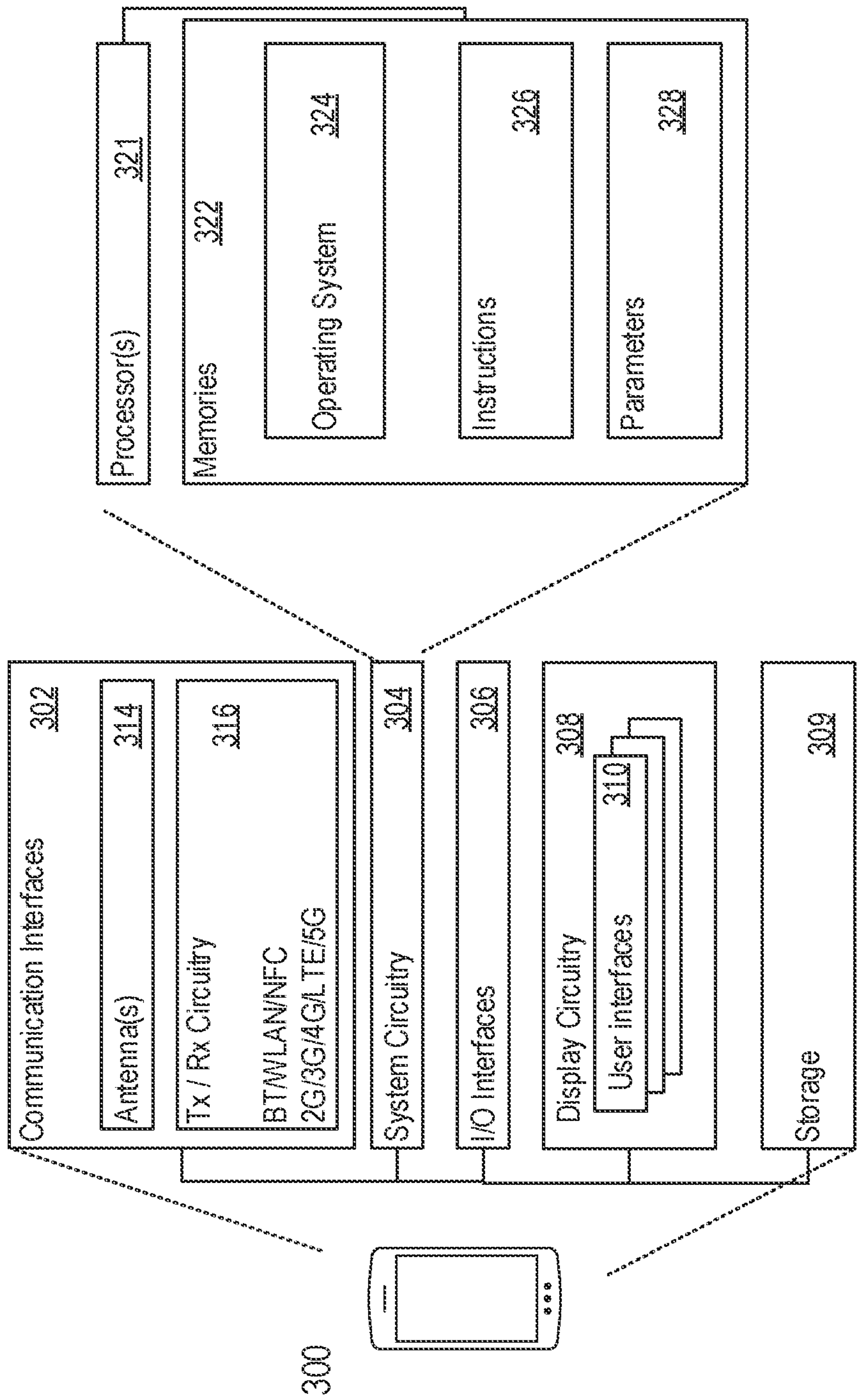
FIG. 3 shows an example of a user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G, 6G, or any future generation communication standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes various embodiments for mapping multiple transport blocks (TBs) in a frequency domain, which may be implemented, partly or totally, on one or more electronic device 200 and/or one or more terminal device 300 described above in FIGS. 2-3. Various embodiments include transmission method for mapping multiple TBs in the frequency domain on a single HARQ process, solving at least one of the problems in achieving large bandwidth, large throughput and low latency transmission.

Various embodiments in the present disclosure may at least solve the issues of differential data transmission according to different priority information of the transmitted data, achieving low-latency for the wireless transmission.

In various embodiments, a transmitting end may map/schedule one or more TB, which have a demand for high reliability, onto frequency resource, which has high transmission quality, improving transmission reliability.

In various embodiments, the description may be described with a single (or one) codeword transmission on a single carrier as examples, and a two codeword transmission may be applicable as well for at least some of the various embodiments.

Figure 4:
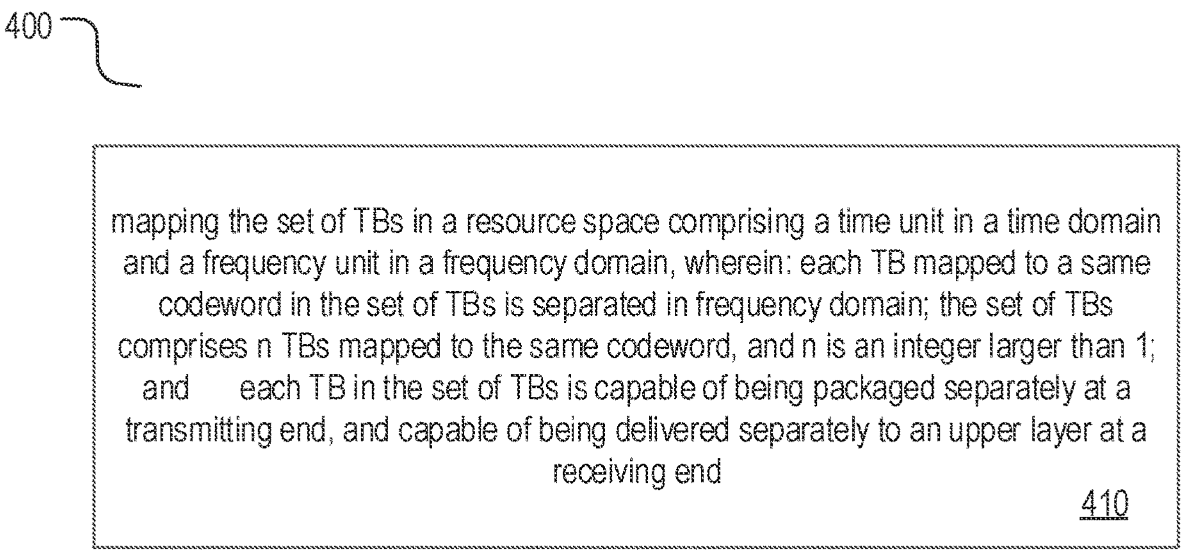
FIG. 4 shows a flow diagram of a method for wireless communication.

In various embodiment, referring to FIG. 4, a method 400 for wireless communication includes transmitting a set of transport blocks (TBs) between a first wireless device and a second wireless device. The method 400 may include step 410: mapping the set of TBs in a resource space comprising a time unit in a time domain and a frequency unit in a frequency domain, wherein: each TB mapped to a same codeword in the set of TBs is separated in frequency domain; the set of TBs comprises n TBs mapped to the same codeword, and n is an integer larger than 1; and each TB in the set of TBs is capable of being packaged separately at a transmitting end, and capable of being delivered separately to an upper layer at a receiving end.

In some implementations, the resource space corresponds to the set of TBs in a hybrid automatic repeat request (HARQ) process in a carrier.

In some other implementations, each TB in the set of TBs corresponds to a media access control (MAC) protocol data unit (PDU).

In some other implementations, the time unit comprises at least one of the following: a transmission time interval (TTI), a slot, a sub-frame, or a mini slot.

In some other implementations, the frequency unit comprises at least one of the following: a subcarrier, a resource block (RB), a subband, a bandwidth part (BWP), or a carrier.

In some implementations, the same codeword comprises at least one of the following: a first codeword, or a second codeword.

In some implementations, the first wireless device is configured to schedule transmission of the set of TBs, and the first wireless device comprises at least one of the following: a base station; a MAC layer in a wireless device; a scheduling unit; a user equipment (UE); an on-board unit (OBU); a road-side unit (RSU); or an integrated access and backhaul (IAB) node.

In some implementations, the second wireless device is configured to receive transmission of the set of TBs, and the second wireless device comprises at least one of the following: a user equipment (UE); or an integrated access and backhaul (IAB) node.

In some implementations, the first wireless device determines a transport block size (TBS) of each TB in the n TBs by: determining, based on a channel state information, a resource space for the n TBs, a modulation coding scheme (MCS) for the n TBs, a number of layers for the n TBs; determining a number of resource block (RB) in the frequency domain of each TB in the n TBs based on a mapping rule; determining a number of REs for each TB in the n TBs based on the number of RB and a number of symbols in the time domain; and determining the TBS of each TB in the n TBs based on the number of REs for each TB in the n TBs, the modulation coding scheme (MCS) for the n TBs, the number of layers for the n TBs.

In some implementations, the mapping rule comprises at least one of the following: a mapping pattern of TB to RB in the frequency domain; a mapping pattern of TB to BWP in the frequency domain; a mapping pattern of TB to subband in the frequency domain; a number of RB for each TB; a mapping relationship of TB index to RB index; a total RBs in the resource space being allocated equally to each TB in the n TBs; mapping the RBs with same channel conditions to a TB; or mapping the TB corresponding to the second codeword according to the mapping rule of the TB corresponding to the first codeword in same time-frequency resource, wherein: a first TB with a first priority level is mapped to a first frequency resource in the frequency domain, a second TB with a second priority level is mapped to a second frequency resource in the frequency domain, the first priority level indicates a higher priority than the second priority level, and the first frequency resource has a higher quality than the second frequency resource.

In some implementations, the priority level in the frequency domain for each TB in the set of TBs comprises at least one of the following: a priority level based on a required reliability for each TB in the set of TBs; a priority level based on a required quality of service (QoS) for each TB in the set of TBs; a priority level based on a service demand for each TB from an upper layer; or a priority level based on a number of transmission times for each TB.

In some implementations, the method 400 may further include sending, by the first wireless device to the second wireless device, control information corresponding to resource allocation of the set of TBs, wherein the control information comprises at least one of the following: a resource space in a frequency domain for the n TBs; a resource indication in a frequency domain for the n TBs; a resource indication in a time domain for the n TBs; a mapping rule; an MCS for the n TBs; spatial multiplexing information related to a number of layers for the set of TBs; power control information for the set of TBs; an identification (ID) number for the n TBs; a resource mapping configuration for the n TBs; a number of TBs in the n TBs; a symbol position information in the time domain for each TB in the n TBs; or a frequency position information in the frequency domain for each TB in the n TBs.

In some implementations, the second wireless device determines a transport block size (TBS) of each TB in the n TBs by: receiving the control information corresponding to the resource allocation of the n TBs; determining, in a HARQ process, a number of resource elements (REs) for each TB, a modulation coding scheme (MCS), a number of layers; and determining the TBS of each TB in the n TBs based on the number of resource elements (REs) for each TB, the modulation coding scheme (MCS), the number of layers.

In some implementations, the mapping rule comprises at least one of the following: a mapping pattern of TB to RB in the frequency domain; a mapping pattern of TB to BWP in the frequency domain; a mapping pattern of TB to subband in the frequency domain; a number of RB for each TB; a mapping relationship of TB index to RB index; a total RBs in the resource space being allocated equally to each TB in the n TBs; mapping the RBs with same channel conditions to a TB; mapping the TB corresponding to the second codeword according to the mapping rule of the TB corresponding to the first codeword in same time-frequency resource, wherein a first TB with a first priority level is mapped to a first frequency resource in the frequency domain, a second TB with a second priority level is mapped to a second frequency resource in the frequency domain, the first priority level indicates a higher priority than the second priority level, and the first frequency resource has a higher quality than the second frequency resource.

In some implementations, the control information is transmitted via at least one of the following: a downlink control information (DCI), a radio resource control (RRC) signaling, a high layer signaling, a MAC control element (CE), or system information.

In some implementations, the method 400 may further include receiving, by the second wireless device, the control information from the first wireless device; processing, by the second wireless device, the set of TBs based on the control information by at least one of the following: receiving data from the first wireless device based on the control information from the first wireless device; sending data to the first wireless device based on the control information from the first wireless device; sending data to a third wireless device based on the control information from the first wireless device; or receiving data from the third wireless device based on the control information from the first wireless device.

In some implementations, the third wireless device is configured to receive or send transmission of the set of TBs, and the third wireless device comprises at least one of the following: a user equipment (UE); or an integrated access and backhaul (IAB) node.

In some implementations, the method 400 may further include in response to receiving the data from the first wireless device, sending, by the second wireless device, feedback information to the first wireless device by at least one of the following: sending the feedback information separately for each TB in the n TBs; sending the feedback information together for the n TBs; sending the feedback information for each code block (CB) in the n TBs; or sending the feedback information for each code block group (CBG) in the n TBs.

In some implementations, the method 400 may further include in response to receiving the data from the second wireless device, sending, by the third wireless device, feedback information to the first wireless device via the second wireless device by at least one of the following: sending the feedback information separately for each TB in the n TBs; sending the feedback information together for the n TBs; sending the feedback information for each code block (CB) in the n TBs; or sending the feedback information for each code block group (CBG) in the n TBs.

In some implementations, the method 400 may further include in response to the feedback information being same for each TB in the n TBs, sending the feedback information comprising a feedback indication for the n TBs, wherein: in response to each TB in the n TBs being received successfully, the feedback information comprises an acknowledgement (ACK) indication indicating each TB in the n TBs being received successfully; and in response to each TB in the n TBs being received unsuccessfully, the feedback information comprises a NAK indication indicating each TB in the n TBs being received unsuccessfully.

Figure 5:
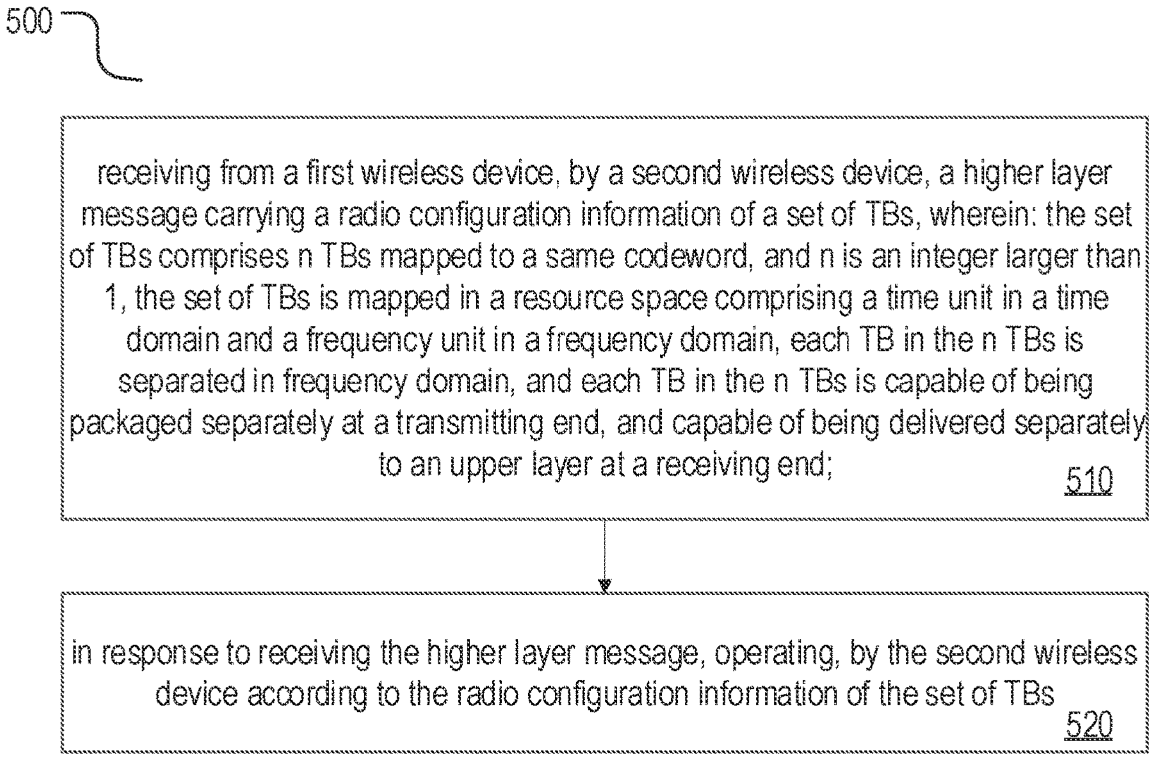
FIG. 5 shows a flow diagram of a method for wireless communication.

In one embodiment, referring to FIG. 5, a method 500 for wireless communication. The method 500 may include a portion or all of the following steps: step 510, receiving from a first wireless device, by a second wireless device, a higher layer message carrying a radio configuration information of a set of TBs, wherein: the set of TBs comprises n TBs mapped to a same codeword, and n is an integer larger than 1, the set of TBs is mapped in a resource space comprising a time unit in a time domain and a frequency unit in a frequency domain, each TB in the n TBs is separated in frequency domain, and each TB in the n TBs is capable of being packaged separately at a transmitting end, and capable of being delivered separately to an upper layer at a receiving end; and step 520, in response to receiving the higher layer message, operating, by the second wireless device according to the radio configuration information of the set of TBs.

In some implementations, the higher layer message is at least one of the following: a layer 3 (L3) layer message, or a radio resource control (RRC) message.

In some other implementations, the radio configuration information comprises at least one of the following: a value of n, or a resource mapping rule.

In some other implementations, the resource space corresponds to the set of TBs in a hybrid automatic repeat request (HARQ) process in a carrier.

In some other implementations, each TB in the set of TBs corresponds to a media access control (MAC) protocol data unit (PDU).

In some other implementations, the time unit comprises at least one of the following: a transmission time interval (TTI), a slot, a sub-frame, or a mini slot.

In some other implementations, the frequency unit comprises at least one of the following: a subcarrier, a resource block (RB), a subband, a bandwidth part (BWP), or a carrier.

In some other implementations, the same codeword comprises at least one of the following: a first codeword, or a second codeword;

In some other implementations, a mapping rule corresponding to a number of resource block (RB) in the frequency domain of each TB in the n TBs comprises at least one of the following: a mapping pattern of TB to RB in the frequency domain; a mapping pattern of TB to BWP in the frequency domain; a mapping pattern of TB to subband in the frequency domain; a number of RB for each TB; a mapping relationship of TB index to RB index; a total RBs in the resource space being allocated equally to each TB in the n TBs; or mapping the TB corresponding to the second codeword according to the mapping rule of the TB corresponding to the first codeword in same time-frequency resource, wherein: a first TB with a first priority level is mapped to a first frequency resource in the frequency domain; a second TB with a second priority level is mapped to a second frequency resource in the frequency domain; the first priority level indicates a higher priority than the second priority level; and the first frequency resource has a higher quality than the second frequency resource.

The present disclosure further describes various embodiments below, which serve as examples and should not be interpreted as any limitations to the present disclosure. In various embodiments, multiple TBs may refer to a set of TBs, wherein a number of TBs mapped to a same codeword in the multiple TBs may be an integer larger than 1.

Embodiment 1: Transmission of Multiple TBs in a TTI

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

Figure 6:
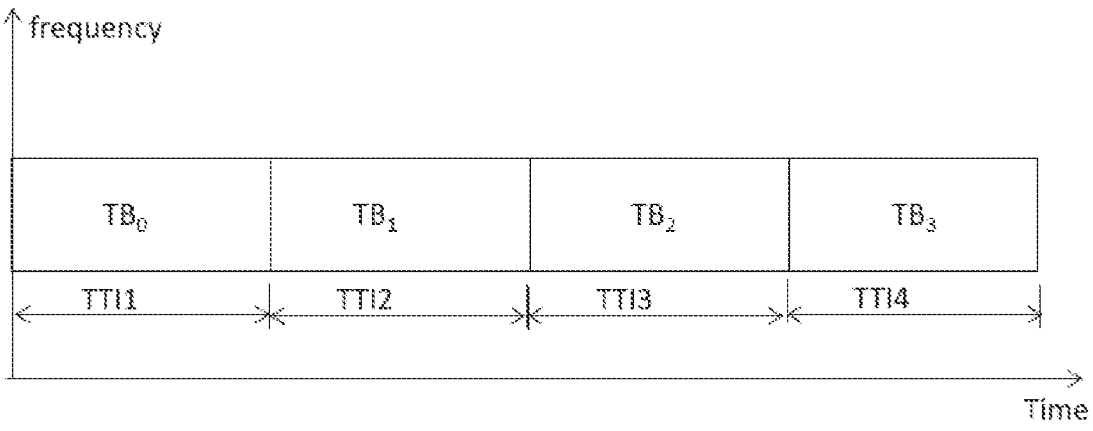
FIG. 6 shows a schematic diagram of an embodiment in the present disclosure for wireless communication.

In some implementations of a 5G system, for a single codeword transmission on a single carrier, each HARQ process may only transmit one TB in one TTI, as shown in FIG. 6. Referring to FIG. 6, four TBs ($TB_0$, $TB_1$, $TB_2$, and $TB_3$) are mapped to four TTIs (TTI1, TTI2, TTI3, and TTI4), respectively in a time domain and a frequency domain.

Figure 7:
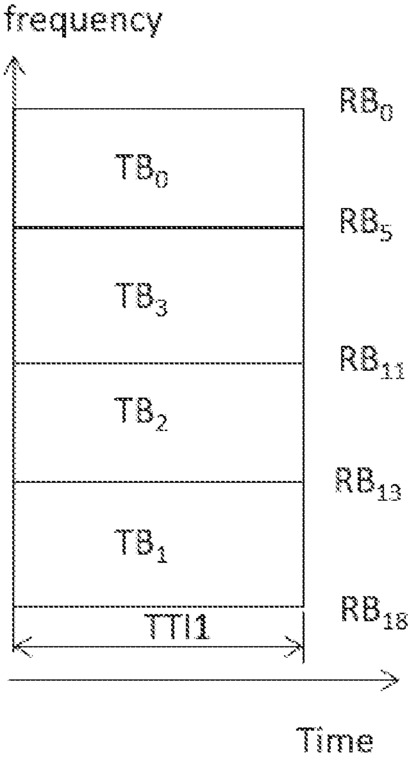
FIG. 7 shows a schematic diagram of an embodiment in the present disclosure for wireless communication.

In some other implementations, multiple TTBs may be transmitted in one TTI, and the multiple TTBs may be mapped/scheduled to different resource in the frequency domain, as shown in FIG. 7. During mapping/scheduling, one or more TB requiring high reliability may be mapped/scheduled onto high-transmission-quality frequency resources, which have good channel conditions.

In some other implementations, multiple TBs may be mapped to different frequency resources for transmission according to the reliability requirements, thus meeting the TB requirements with different reliability requirements. In a large bandwidth, considering an effect of frequency selective fading, different frequency domain resources may have different frequency selective gains. A base station may learn the fading conditions of different frequency band resources through CSI measurement. The base station may, during scheduling, allocate data corresponding to different TBs to different frequency domain resources according to the radio channel measurement (CSI measurement).

For one example, referring to FIG. 7, the channel quality from one or more resource block (e.g, $RB_0$ to $RB_5$) is the best, so that $TB_0$, which has the highest reliability requirements, may be mapped/scheduled to occupy the frequency domain resources from $RB_0$ to $RB_5$. The channel quality from $RB_6$ to $RB_{11}$ is the second best, so that $TB_3$, which has the second highest reliability requirements, may be mapped/scheduled to occupy the frequency domain resources from $RB_6$ to $RB_{11}$. Following this mapping policy, $TB_2$ may be mapped/scheduled to occupy the frequency domain resources from $RB_{12}$ to $RB_{13}$; and/or $TB_1$ may be mapped/scheduled to occupy the frequency domain resources from $RB_{14}$ to $RB_{18}$.

Embodiment 2: Mapping Multiple TBs in a Frequency Domain

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

Taking a single codeword stream as an example, the various implementations for mapping/scheduling multiple TBs may include a portion or all of the following steps.

Step 2-1: A base station may schedule n TBs jointly, i.e. scheduling n TBs as a whole, wherein a same MCS, a common time-frequency domain range, and same mapping rules are allocated to n TBs on one carrier. The value of n is determined according to business requirements such as throughput and/or latency requirements. In some implementations, n may be an integer greater than 1.

Step 2-2: The base station performs physical layer processing and mapping on each TB of the n TBs according to the scheduling results. According to the channel measurement results, the base station may give priority to a TB with the highest reliability requirement for allocating frequency domain resources. After completing the frequency domain allocation to the TB with the highest reliability requirement, the base station may allocate time domain resources to the TB.

The base station may, according to the channel measurement results and the remaining frequency domain resources, give priority to a second TB with the second highest reliability requirement for allocating frequency domain resources. After completing the frequency domain allocation to the second TB, the base station may allocate time domain resources to the second TB. Following this mapping policy, the base station may assign different TBs to frequency domain resources according to their priority, respectively. The frequency domain resources allocated to each TB may be a continuous frequency space or more than one discontinuous frequency spaces. The size of the frequency resources allocated to different TBs may be a same size or different sizes.

Step 2-3: The base station sends a scheduling information indication of n TBs (such as using DCI) to the UE. The scheduling information includes the common scheduling information of n TBs, which includes at least one of the following: the same MCS, the common time-frequency domain range, the mapping rule, a TB number in n TBs. In some implementations, the scheduling information may further include the dedicated scheduling information of each TB in the n TBs, and which includes at least one of the following: each TB number, a specific symbol position of each TB in the time domain, a specific position of each TB in the frequency domain. The scheduling information indication may also include dedicated scheduling information for each TB of n TBs, such as each TB number, a time domain symbol position index of each TB, a start and end positions of each TB time domain symbol, a bitmap for time domain symbols of each TB, and/or a specific frequency domain index of each TB.

Step 2-4: A UE performs reception processing of each TB within the common time-frequency domain on the carrier according to the received scheduling information.

Step 2-5: After the UE decodes the TB, it sends feedback to the base station. The feedback may be based on n TBs jointly, based on each TB, based on each CB, or based on each CBG.

Step 2-6: The UE may immediately deliver to the MAC layer after successfully receiving a complete TB.

Since the TB with high reliability requirement is placed on frequency domain resources with good channel conditions, the reception success rate may be high, thereby improving transmission reliability. In various embodiments, differentiated transmission in the frequency domain is realized, satisfying requirements of different reliability demand data transmission.

Embodiment 3: Parallel Processing for Multiple TB in Frequency Domain

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

Figure 8:
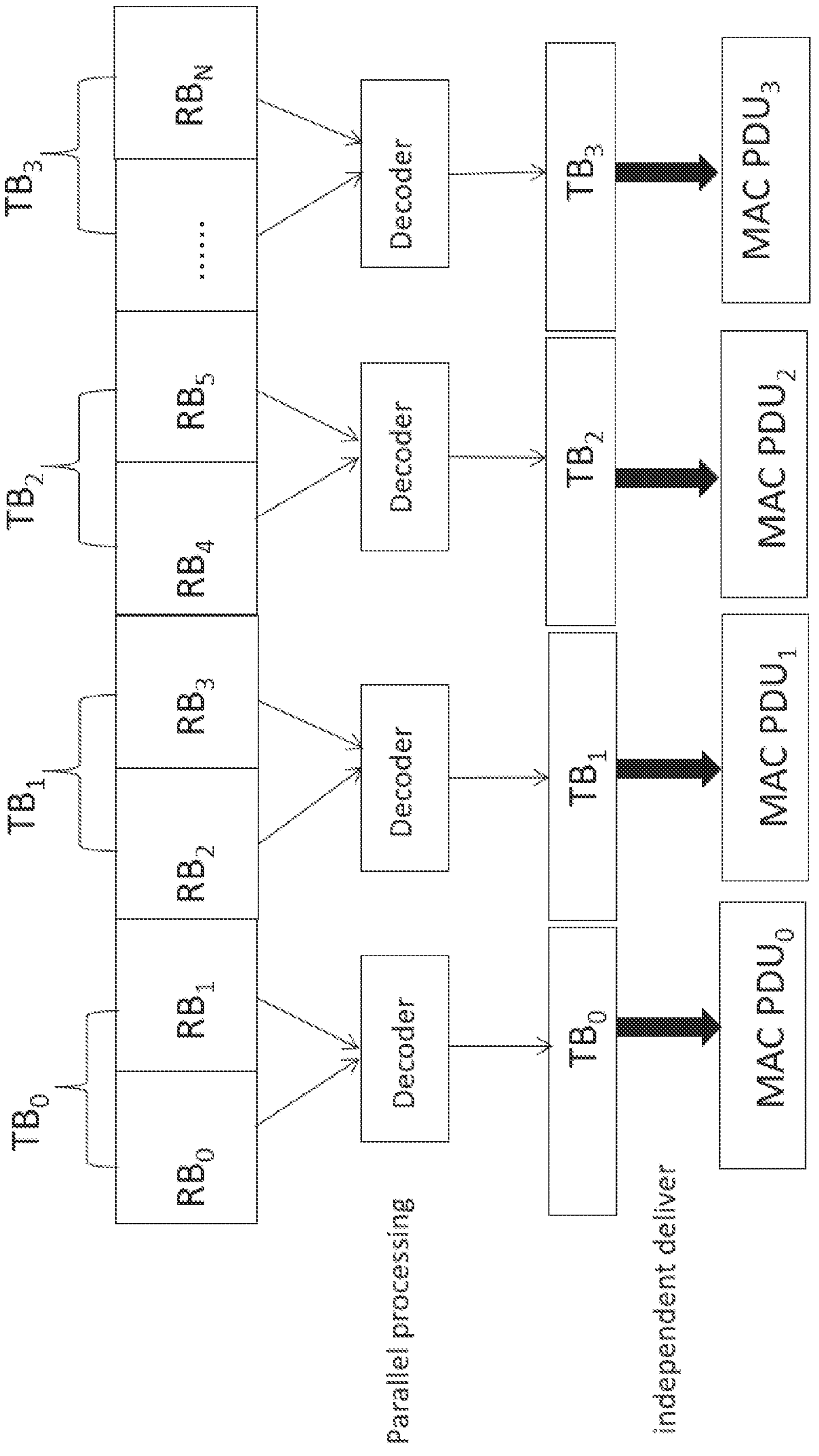
FIG. 8 shows a schematic diagram of an embodiment in the present disclosure for wireless communication.

Referring to FIG. 8, after receiving multiple TBS on a TTI, because each TB is independent, the receiver can process the received TB in parallel, such as parallel decoding, after receiving the complete TB data in frequency domain. Parallel processing can improve the processing delay of the receiver. For example, by increasing the number of decoders to support more TB transmission on a TTI, it can effectively improve the throughput and reduce the processing delay.

Embodiment 4: Public and Dedicated Scheduling Information in DCI

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

A base station may transmit a DCI indication to a UE for scheduling transmission of n TBs jointly or scheduling transmission of the TB group of the UE. The DCI indication may include public scheduling information and/or dedicated scheduling information.

The public (or common) scheduling information may be also called a set of TBs scheduling information, which means that all TBs in the TB group use the same scheduling information. The public (or common) scheduling information may include at least one of the following: an MCS, a time-frequency domain resource range, mapping rules, a TB group number, TB information included in the TB group, and power control parameters, an antenna transmission mode, etc.

The base station also sends dedicated scheduling information used by each TB. The dedicated scheduling information includes at least one of the following: the TB number, the specific symbol position of the TB time domain, the start and end positions of the TB time domain symbol, the TB time domain position bitmap, and the specific position of the TB frequency domain.

Embodiment 5: Transmission of Multiple TBs in a Two Codeword Transmission

For a 5G system, one TB corresponds one codeword. When a spatial multiplexing technology is used, a single carrier may be allowed to transmit two TBs of the user in one HARQ process in one TTI in the manner of two codeword transmission. In two codeword transmission, one TB is mapped to the first codeword, and another TB is mapped to the second codeword. The two TBs use the same time-frequency resources. But each TB has its own MCS and layer number corresponding its codeword.

In various embodiments in the present disclosure, two TBs in one HARQ process in one TTI may be transmitted in scenarios of multi-TB transmission under dual codeword stream/transmission.

Figure 9:
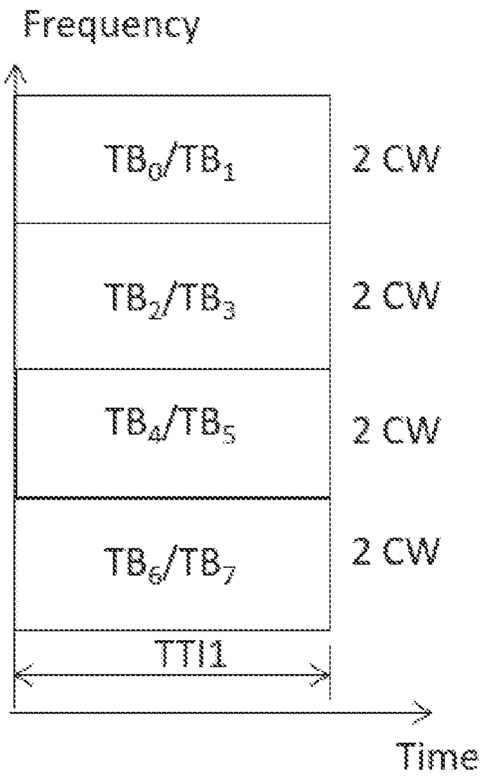
FIG. 9 shows a schematic diagram of an embodiment in the present disclosure for wireless communication.

As shown in FIG. 9, in a single carrier and in one HARQ process, a UE may achieve 8 TB transmission in a two codeword transmission within a TTI, while a 5G system in previous technology may only achieve 2 TB transmission under the same circumstances.

As shown in FIG. 9, for example, $TB_0$ and $TB_1$ corresponding two codeword is in the same time-frequency resource. $TB_0$ corresponds the first codeword. $TB_1$ corresponds the second codeword. There are 4 TBs ($TB_0$, $TB_2$, $TB_4$, $TB_6$) in the first codeword in one TTI, and 4 TBs ($TB_1$, $TB_3$, $TB_5$, $TB_7$) in the second codeword in the same one TTI. The 4 TBs of $TB_0$, $TB_2$, $TB_4$, and $TB_6$ use the same MCS and spatial multiplexing layer mapping (the same layer number). The 4 TBs of $TB_1$, $TB_3$, $TB_5$, and $TB_7$ use the same MCS and spatial multiplexing layer mapping (the same layer number).

Embodiment 6: Configuration of n and Mapping Policy for Multiple TBs Via RRC Signaling In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

For multi-TB transmission in a TTI and in a single HARQ process on a single carrier, a network side, for example a base station, may send configuration information to a terminal via RRC signaling. The terminal may receive the RRC configuration message. The configuration information may include at least one of a value of n in same codeword transmission or mapping rule for a set of TBs.

For example, the network side may initiate the RRC reconfiguration process, and the RRC configuration information includes fields corresponding to transmission of multiple TBs. The fields in the configuration information may include the total number n of TBs in the same codeword transmission in multiple TBs transmission and/or resource mapping rule for the multiple TBs. The UE may receive the RRC reconfiguration message. When the RRC reconfiguration message contains a transmission field for multiple TBs, the lower layer configuration of multi-TB is performed.

In some implementations, n is an integer greater than 1, and each TB of the n TBs may be independently packaged at the transmitting end, and may be independently delivered to the upper layer at the receiving end. TB resource mapping policy may correspond to a TB mapping strategy wherein each TB in multiple TBs may be mapped to a different time-frequency resource.

Embodiment 7: Calculation of TB Size for Multiple TBs in a HARQ Process

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

The receiving side, for example a UE (UE1) in single codeword transmission, may receive transmissions of multiple TBs in a HARQ process.

Upon receiving scheduling control information (for example, a DCI signal), the UE1 may perform, according to the indication of the scheduling control information, reception processing on n TBs within a common time-frequency domain on a carrier on a HARQ process. the scheduling control information including a mapping rule, an MCS for n TBs and layer mapping information (for example, the number of layers for nTB). According to the scheduling control information, the receiving side may obtain which symbols corresponding one TB from a mapping rule to calculate the REs of one TB. The receiving side can infer a number of resource elements (REs) of one TB according the frequency resource of the TB. The method for determining a TB size (TBS) of TB may include a portion or all of the following steps.

Step 7-1: A UE may determine the resource block (RB) number in the frequency domain corresponding a TB according to the scheduling control information.

Step 7-2: The UE may determine a number of resource elements (REs) for the TB in a time-frequency domain in a HARQ process based on a mapping rule.

Step 7-3: The UE may calculate a TB size of the TB according to the number of REs for the TB, a same MCS for n TBs and a same number of layers for n TBs.

Embodiment 8: In Semi-Persistent Scheduling (SPS): Same Scheduling Information for a Period of Time In a semi-persistent scheduling (SPS), a base station may use a same scheduling information to perform simultaneous scheduling and transmission of multiple TBs of a single HARQ process within a period of time, thereby reducing overhead to indicate the scheduling information.

In the SPS scheduling scenario, the base station may determine that a single carrier transmits multiple TB scheduling information for a single HARQ process on a TTI. For example, in a period of time, which may be relatively long, a number and a size of TBs in a single HARQ process may remain unchanged, an MCS level may remain unchanged, and/or a TB time-frequency resource location may remain unchanged.

Embodiment 9: Device-To-Device (D2D) Scenario

In a device-to-device (D2D) scenario, a base station may determine the scheduling information of a UE (for example, UE1). The UE1may send multiple TB data to another UE (for example UE2) in one HARQ process according to the multi-TB scheduling information of a single HARQ process determined by the base station. The UE2 may send feedback to the base station after receiving the data. The embodiment may be applicable to other scenarios, for example but not limited to, integrated access and backhaul (IAB).

Embodiment 10: Transmission of Multiple TBs in a TTI

In the method, the nTBs in a TTI in a carrier in a HARQ process are mapped to the first codeword. Unless specifically stated, the description may be described with a single (or one) codeword transmission on a single carrier as examples. But a two codeword transmission may be applicable as well for at least some of the various embodiments.

Figure 10:
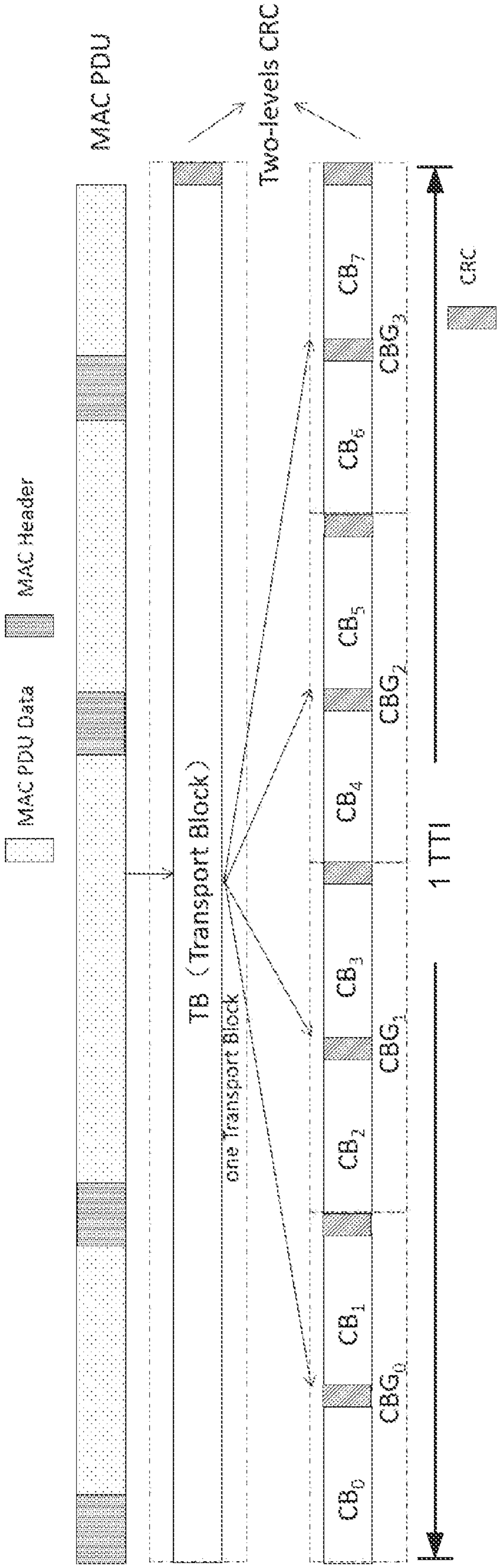
FIG. 10 shows a schematic diagram of an embodiment in the present disclosure for wireless communication.

As shown in FIG. 10, in a 5G system, at a MAC layer, a MAC PDU may be composed of multiple sub-PDUs, and each sub-PDU is composed of a sub-header and a data part. MAC PDU is a data unit that may be delivered to a physical layer after the MAC layer protocol is processed. One MAC PDU may correspond to one TB of the physical layer. At the physical layer, a TB may be divided into one or more code block (CB) and/or one or more code block group (CBG). In a TTI and in a single HARQ process, when spatial multiplexing and multi-carrier are not considered, only one TB may be transmitted on a single carrier. In one TTI, only one TB is delivered to MAC layer.

Figure 11:
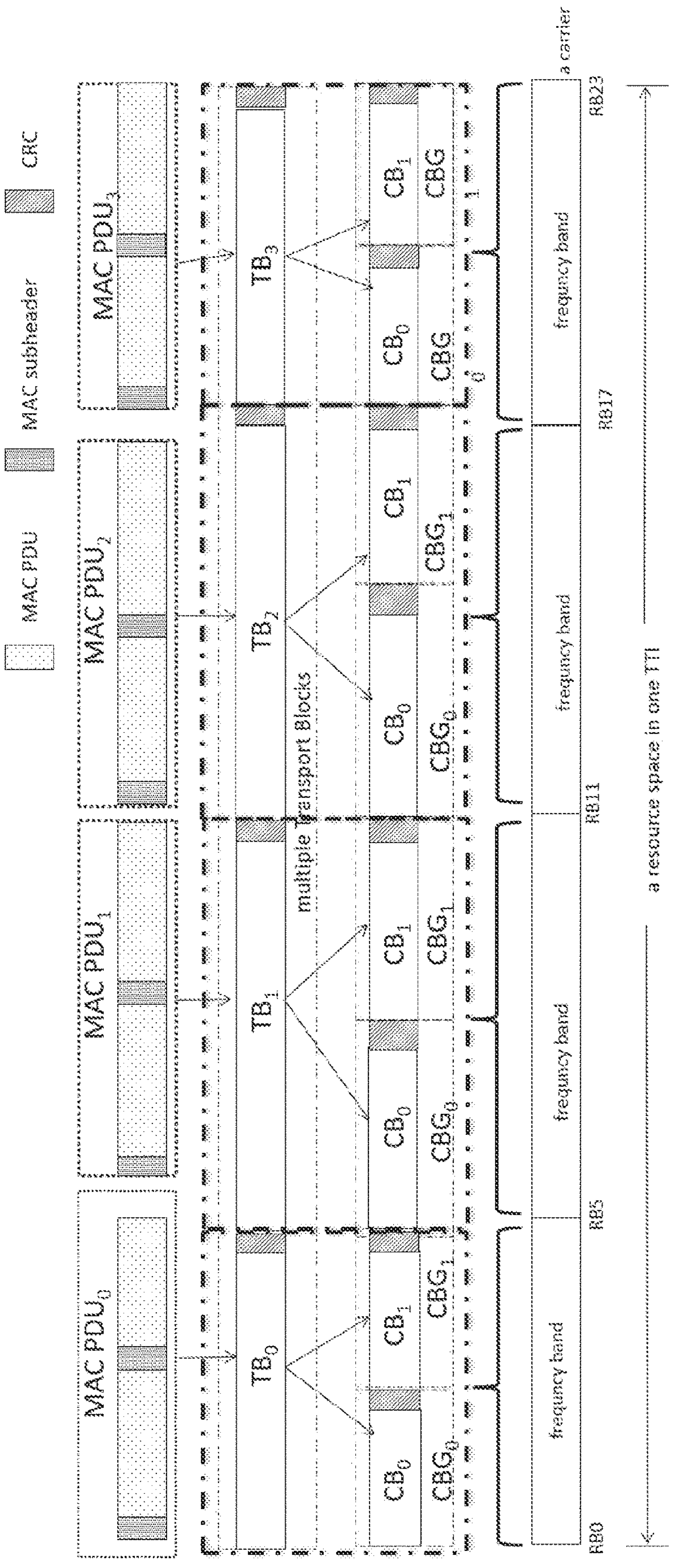
FIG. 11 shows a schematic diagram of an embodiment in the present disclosure for wireless communication.

As shown in FIG. 11, in some implementations, one MAC PDU may still correspond to one TB of a physical layer. At the physical layer, each TB may still be divided into one or more CB and/or one or more CBG.

In a single HARQ process in a TTI, multiple MAC PDUs may be used to map to multiple TBs, and multiple TBs may be transmitted on a single carrier on a TTI. At the transmitting end, each TB corresponds to an independent MAC PDU, and each TB may independently be packaged at the transmitting end and be delivered to the MAC layer independently at the receiving end. At the receiving end, when receiving n TBs, there may be a situation where one or more TBs are transmitted correctly, and one or more TBs are transmitted incorrectly. In response to this situation, the data of correct TBs may be directly delivered to the MAC layer without waiting for the retransmission of the wrong (incorrectly transmitted) one or more TBs. In one TTI, one or more TBs may be delivered to MAC layer. This implementation may achieve lower latency while ensuring high throughput.

Figure 12:
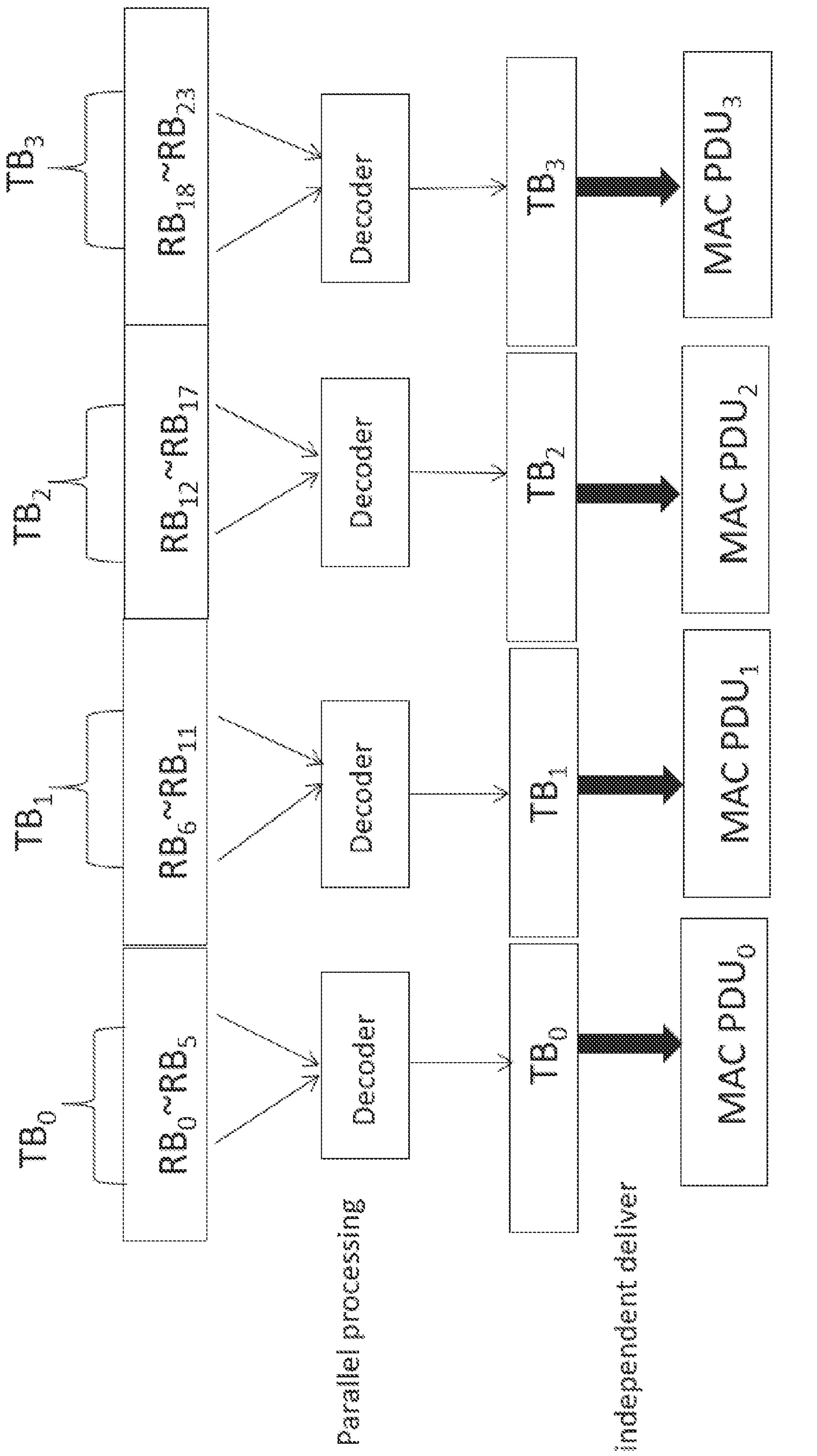
FIG. 12 shows a schematic diagram of an embodiment in the present disclosure for wireless communication

In some implementations, multiple MAC PDUs may be used to map to multiple TBs. As shown in FIG. 12, the receiving end may include multiple decoders to decode each of the multiple TBs independently according to the scheduling instructions of multiple TBs. The multiple TBs in one TTI are mapped to different resource block (RB) of the frequency domain, the TBs of one TTI can be received simultaneously and parallel processing. The performance of the system may be further improved by decreasing the processing delay of decoding and achieving the effect of low latency.

The present disclosure describes methods, apparatus, and computer-readable medium for wireless communication. The present disclosure addressed the issues with mapping multiple transport blocks (TBs) in a frequency domain. The methods, devices, and computer-readable medium described in the present disclosure may facilitate the performance of wireless communication by mapping multiple TBs in a frequency domain, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
transmitting a set of transport blocks (TBs) between a first wireless device and a second wireless device by:
mapping the set of TBs in a resource space comprising a time unit in a time domain and a frequency unit in a frequency domain, wherein:
each TB mapped to a same codeword in the set of TBs is separated in frequency domain;
the set of TBs comprises n TBs mapped to the same codeword, and n is an integer larger than 1; and
each TB in the set of TBs is capable of being packaged separately at a transmitting end, and capable of being delivered separately to an upper layer at a receiving end.

2. The method according to claim 1, wherein:
the resource space corresponds to the set of TBs in a hybrid automatic repeat request (HARQ) process in a carrier.

3. The method according to claim 1, wherein:
each TB in the set of TBs corresponds to a media access control (MAC) protocol data unit (PDU).

4. The method according to claim 1, wherein:
the time unit comprises at least one of the following:
a transmission time interval (TTI),
a slot,
a sub-frame, or
a mini slot.

5. The method according to claim 1, wherein:
the frequency unit comprises at least one of the following:
a subcarrier,
a resource block (RB),
a subband,
a bandwidth part (BWP), or
a carrier.

6. The method according to claim 1, wherein:
the same codeword comprises at least one of the following: a first codeword, or a second codeword.

7. The method according to claim 1, further including:
receiving, by the second wireless device, control information corresponding to resource allocation of the set of TBs from the first wireless device, wherein the control information comprises at least one of the following:
a resource space in a time-frequency domain for the n TBs;
a resource indication in a frequency domain for the n TBs;
a resource indication in a time domain for the n TBs;
a mapping rule;
an MCS for the n TBs;
spatial multiplexing information related to a number of layers for the set of TBs;
power control information for the set of TBs;
an identification (ID) number for the n TBs;
a resource mapping configuration for the n TBs;
a number of TBs in the n TBs;
a symbol position information in the time domain for each TB in the n TBs; or
a frequency position information in the frequency domain for each TB in the n TBs.

8. The method according to claim 7, wherein:
the second wireless device determines a transport block size (TBS) of each TB in the n TBs by:
receiving the control information corresponding to the resource allocation of the n TBs;
determining, in a HARQ process, a number of resource elements (REs) for each TB, a modulation coding scheme (MCS), a number of layers; and
determining the TBS of each TB in the n TBs based on the number of resource elements (REs) for each TB, the modulation coding scheme (MCS), the number of layers.

9. The method according to claim 7, the mapping rule comprises at least one of the following:
a mapping pattern of TB to RB in the frequency domain;
a mapping pattern of TB to BWP in the frequency domain;
a mapping pattern of TB to subband in the frequency domain;
a number of RB for each TB;
a mapping relationship of TB index to RB index;
a total RBs in the resource space being allocated equally to each TB in the n TBs;
mapping the RBs with same channel conditions to a TB;
mapping the TB corresponding to the second codeword according to the mapping rule of the TB corresponding to the first codeword in same time-frequency resource,
wherein a first TB with a first priority level is mapped to a first frequency resource in the frequency domain, a second TB with a second priority level is mapped to a second frequency resource in the frequency domain, the first priority level indicates a higher priority than the second priority level, and the first frequency resource has a higher quality than the second frequency resource.

10. The method according to claim 7, wherein:

the control information is transmitted via at least one of the following:

a downlink control information (DCI), a radio resource control (RRC) signaling, a high layer signaling, a MAC control element (CE), or system information.

11. The method according to claim 7, further comprising:

receiving, by the second wireless device, the control information from the first wireless device; and processing, by the second wireless device, the set of TBs based on the control information by at least one of the following:

receiving data from the first wireless device based on the control information from the first wireless device;

sending data to the first wireless device based on the control information from the first wireless device;

sending data to a third wireless device based on the control information from the first wireless device; or receiving data from the third wireless device based on the control information from the first wireless device.

12. The method according to claim 11, further comprising:

in response to receiving the data from the first wireless device, sending, by the second wireless device, feedback information to the first wireless device by at least one of the following:

sending the feedback information separately for each TB in the n TBs;

sending the feedback information together for the n TBs;

sending the feedback information for each code block (CB) in the n TBs; or sending the feedback information for each code block group (CBG) in the n TBs.

13. The method according to claim 12, further comprising:

in response to the feedback information being same for each TB in the n TBs, sending the feedback information comprising a feedback indication for the n TBs, wherein:

in response to each TB in the n TBs being received successfully, the feedback information comprises an acknowledgement (ACK) indication indicating each TB in the n TBs being received successfully; and in response to each TB in the n TBs being received unsuccessfully, the feedback information comprises a NAK indication indicating each TB in the n TBs being received unsuccessfully.

14. The method according to claim 1, wherein:

the first wireless device is configured to schedule transmission of the set of TBs, and the first wireless device comprises at least one of the following:

a base station;

a MAC layer in a wireless device;

a scheduling unit;

a user equipment (UE);

an on-board unit (OBU);

a road-side unit (RSU); or an integrated access and backhaul (IAB) node.

15. The method according to claim 1, wherein:

the second wireless device is configured to receive transmission of the set of TBs, and the second wireless device comprises at least one of the following:

a user equipment (UE); or an integrated access and backhaul (IAB) node.

16. The method according to claim 11, wherein:

the third wireless device is configured to receive or send transmission of the set of TBs, and the third wireless device comprises at least one of the following:

a user equipment (UE); or an integrated access and backhaul (IAB) node.

17. A wireless communications apparatus comprising:

a memory operable to store computer-readable instructions; and a processor circuitry operable to read the computer-readable instructions, the processor circuitry when executing the computer-readable instructions is configured to:

transmit a set of transport blocks (TBs) between a first wireless device and a second wireless device by:

map the set of TBs in a resource space comprising a time unit in a time domain and a frequency unit in a frequency domain, wherein:

each TB mapped to a same codeword in the set of TBs is separated in frequency domain;

the set of TBs comprises n TBs mapped to the same codeword, and n is an integer larger than 1; and each TB in the set of TBs is capable of being packaged separately at a transmitting end, and capable of being delivered separately to an upper layer at a receiving end.

* * * * *